(12) United States Patent
Brown et al.

(10) Patent No.: US 8,441,749 B2
(45) Date of Patent: May 14, 2013

(54) SHAPE MEMORY ALLOY ACTUATION APPARATUS

(75) Inventors: Andrew Benjamin David Brown, Cambridge (GB); Richard Topliss, Trumpington (GB)

(73) Assignee: Cambridge Mechatronics Limited, Cambridge (GB)

( * ) Notice: Subject to any disclaimer, the term of this patent is extended or adjusted under 35 U.S.C. 154(b) by 0 days.

(21) Appl. No.: 13/146,462

(22) PCT Filed: Jan. 27, 2010

(86) PCT No.: PCT/GB2010/000125
§ 371 (c)(1),
(2), (4) Date: Jul. 27, 2011

(87) PCT Pub. No.: WO2010/089526
PCT Pub. Date: Aug. 12, 2010

(65) Prior Publication Data
US 2011/0279916 A1  Nov. 17, 2011

(30) Foreign Application Priority Data

Feb. 9, 2009 (GB) .................................. 0901952.2
Feb. 26, 2009 (GB) .................................. 0903226.9
Jul. 30, 2009 (GB) .................................. 0913299.4

(51) Int. Cl.
*G02B 7/02* (2006.01)
*G03B 3/10* (2006.01)
*H04N 5/225* (2006.01)

(52) U.S. Cl.
USPC ........... 359/823; 359/813; 359/814; 359/820; 359/822; 396/133

(58) Field of Classification Search .................. 359/813, 359/814, 820, 822–824, 694; 348/65, 373, 348/374; 396/133; 60/527; 369/44.14–44.16
See application file for complete search history.

(56) References Cited

U.S. PATENT DOCUMENTS 5,459,544 A  10/1995  Emura
5,763,979 A   6/1998  Mukherjee et al.
(Continued)

FOREIGN PATENT DOCUMENTS

EP  1626177 A1  2/2006
EP  1640757 A1  3/2006
(Continued)

*Primary Examiner* — Loha Ben
(74) *Attorney, Agent, or Firm* — Harness, Dickey & Pierce, P.L.C.

(57) ABSTRACT

An SMA actuation apparatus comprises a camera lens element supported on a support structure by a plurality of flexures. An SMA wire at an acute angle to the movement axis and a biasing element are connected between the support structure and the movable element. A component of the force applied by the SMA wire perpendicular to the movement axis compresses the flexures causing them to apply a force to the movable element having a component along the movement axis in the same direction as the SMA wire. An end-stop limits the movement of the movable element, and the moment applied by the end-stop to the movable element about the center of stiffness is equal to the moment applied by the SMA wire about the center of stiffness at the point when the movable element loses contact with the end-stop on contraction of the SMA wire.

19 Claims, 4 Drawing Sheets

U.S. PATENT DOCUMENTS

| | | | |
|---|---|---|---|
| 6,374,608 B1 * | 4/2002 | Corris et al. | 60/528 |
| 6,449,434 B1 | 9/2002 | Fuss | |
| 6,574,958 B1 | 6/2003 | MacGregor | |
| 8,000,027 B2 * | 8/2011 | Hirata et al. | 359/694 |
| 8,073,320 B2 * | 12/2011 | Topliss et al. | 396/133 |
| 8,077,411 B2 * | 12/2011 | Shyu et al. | 359/823 |
| 2006/0185359 A1 | 8/2006 | Hamaguchi et al. | |
| 2008/0282696 A1 | 11/2008 | Wada et al. | |
| 2009/0295986 A1 * | 12/2009 | Topliss et al. | 348/374 |
| 2011/0179786 A1 * | 7/2011 | Topliss et al. | 60/527 |
| 2011/0252782 A1 * | 10/2011 | Nobe | 60/527 |

FOREIGN PATENT DOCUMENTS

| | | |
|---|---|---|
| GB | 2434214 A | 7/2007 |
| JP | 2002 130114 | 5/2002 |
| JP | 2004333995 A | 11/2004 |
| JP | 2006330542 A | 12/2006 |
| JP | 2007060530 A | 3/2007 |
| JP | 2007315352 A | 12/2007 |
| JP | 2009122602 A | 6/2009 |
| WO | WO-0147041 A2 | 6/2001 |
| WO | WO-02103451 A1 | 12/2002 |
| WO | WO-03048831 A2 | 6/2003 |
| WO | WO-2006054535 A1 | 5/2006 |
| WO | WO-2006059098 A1 | 6/2006 |
| WO | WO-2007-113478 A1 | 10/2007 |
| WO | WO-2008-099155 A1 | 8/2008 |
| WO | WO-2008-099156 | 8/2008 |
| WO | WO-2008-129291 A2 | 10/2008 |
| WO | WO-2008129290 A1 | 10/2008 |
| WO | WO-2009/056822 A2 | 5/2009 |
| WO | WO-2009-071898 A2 | 6/2009 |
| WO | WO-2009069570 A1 | 6/2009 |
| WO | WO-2009096207 A1 | 8/2009 |

\* cited by examiner

SHAPE MEMORY ALLOY ACTUATION APPARATUS

CROSS-REFERENCE TO RELATED APPLICATIONS

This application is a 371 U.S. National Stage of International Application No. PCT/GB2010/000125, filed Jan. 27, 2010. This application claims priority to British patent application No. 0901952.2, filed with the Intellectual Property Office on Feb. 9, 2009, British patent application No. 0903226.9, filed with the Intellectual Property Office on Feb. 26, 2009, and British patent application No. 0913299.4, filed with the Intellectual Property Office on Jul. 30, 2009, all of which applications are herein incorporated by reference in their entirety.

The present invention relates to an apparatus in which an actuator is used to drive movement of a movable element supported on a support structure. In some aspects, it relates in particular to an apparatus which is a shape memory alloy (SMA) actuation apparatus using SMA material as the actuator.

The present invention is generally applicable to any type of movable element but has particular application to actuation of a camera lens element, for example of the type used in a miniature camera which may be employed in a portable electronic device such as a mobile telephone or a mobile digital data processing and/or transmitting device. In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement. At the same time it is desired that the actuator arrangement is itself compact given the desire for miniaturization of the camera apparatus as a whole. In practical terms, these points limit the types of actuation arrangement which can be applied.

DESCRIPTION OF RELATED ART

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electro-active devices and one example is an actuator comprising a curved structure of helically coiled piezoelectric bender tape as disclosed in WO-01/47041 which may be used as an actuator for a camera lens as described in WO-02/103451.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a current through the SMA actuator to heat it causing the phase change. The phase change occurs over a range of temperature due to the statistical spread of transition temperature in the SMA crystal structure. The SMA actuator is arranged so that the contraction drives movement of the movable element. Conventionally a biasing means provides a bias force in an opposite direction from the force applied by the SMA actuator on contraction.

The use of SMA material as an actuator for a small object such as a camera lens element of a miniature camera provides the advantages of being intrinsically linear, providing a high power per unit mass, being a low cost commodity item and being a relatively small component.

It is also necessary to consider the suspension system that suspends the movable element and guides movement along a movement axis. For precision applications, the movement must suffer a minimum of deviance from the nominal movement axis over the range of movement and when the apparatus is orientated in different positions. The deviance may be in the form of a relative angular tilt and/or linear translation of the axes. This is particularly true for a camera lens element for which these deviances may cause a degradation of image quality. Thus the suspension system ideally has a low stiffness or resistive force in the direction of the desired motion and high stiffness in all other directions.

The present invention relates to a suspension system comprising a plurality of resilient flexures. These may be coupled between the support structure and the movable element to support the movable element on the support structure and to guide movement of the movable element along a movement axis by deflection of the flexures. Flexures provide numerous benefits as a suspension system. The flexures may be arranged to provide a low stiffness along the movement axis and a high stiffness perpendicular to the movement axis. Similarly, flexures experience a minimal degree of friction against movement, as compared for example to a bearing. Lastly, a suspension system formed by flexures is compact and straightforward to manufacture.

WO-2007/113478 discloses an example of an SMA actuation apparatus in which the movable element is a camera lens element supported by a suspension system comprising a plurality of flexures.

The first aspect of the present invention is concerned with the arrangement of an SMA actuation apparatus in which a movable element is supported for movement on a support structure by a suspension system comprising a plurality of flexures, and is driven by an SMA wire connected between the support structure and the movable element at an acute angle to the movement axis. In such an apparatus, it is desirable to balance a number of factors.

Firstly it is desirable to control the stress generated in the SMA wire. An issue in an SMA apparatus in which the actuator is an SMA actuator and the suspension system comprises a plurality of flexures, is to design an apparatus to provide a desired range of movement. There are various variables and constraints, including the arrangement and properties of the SMA material, and the arrangement and properties of the flexures of the suspension system.

Where a suspension system comprises a plurality of flexures, a perceived advantage is that the flexures also act as a biasing means providing a bias force in an opposite direction from the force applied by the SMA actuator on contraction.

Desirably, the apparatus is configured to require a relatively high stress to be developed in the SMA actuator to move the movable element away from the rest position in which the SMA actuator is unactivated. This may be achieved by means of providing an end-stop which limits the movement of the movable element in direction opposite to the direction of movement driven by contraction. The end-stop is positioned to pre-stress the biasing means, which stress must be overcome by the SMA actuator on activation to generate movement.

Such pre-stress is desirable for a number of reasons. Firstly this raises the temperature at which the stress in the SMA material is sufficient to cause contraction against the biasing means. This is desirable to increase the range of ambient temperatures at which the apparatus is usable. Secondly, in the rest state, the pre-stressing of the biasing means holds the movable element firmly against the end-stop. This is desirable to precisely control the position and prevent movement of the movable element caused by external forces.

However, such pre-stressing needs to be balanced against other design constraints, notably the range of movement achievable. The maximum movement achievable is constrained by the need to avoid a degree of deflection of the flexures which causes the material limits of the flexures to be exceeded.

The pre-stressing can be increased by moving the position of the end-stop. However, this directly reduces the range of movement.

The pre-stressing can also be increased by increasing the stiffness of the flexures. This increases the pre-stress force in the rest state. However, on deflection of the flexures it also causes the material limits of the flexures to be approached more quickly and so can indirectly reduce the range of movement.

Secondly, for many types of movable element it is desirable to minimise tilting of the movable element. An example of a type of movable element where tilt is an issue is where the movable element is a camera lens element in which case tilt can degrade the optical performance of the camera element. For example in the case of a miniature camera, tilt is desirably kept below a limit which may be less than 0.1. Furthermore in the case of a camera lens element, the requirement that the actuation optics are not obstructed tends to mean that the actuation arrangement is arranged to apply an actuation force at a position displaced considerably from the optical axis such that a relatively large moment is generated around the centre of mass.

Balancing these factors relating to the stress in the SMA wire and reduction of tilt is difficult to achieve in practice.

To deal with the problem of tilt, WO-2007/113478 discloses an arrangement in which the actuator comprises a plurality of lengths of SMA wire held in tension between a camera lens element and a support structure at respective acute angles in positions and orientations around the optical axis such that the forces generated between the camera lens element and the support structure by the lengths of SMA wire are balanced to provide a net effect of substantially no off-axis movement or tilting of the camera lens element. This is effective in reducing tilt, but requires high manufacturing tolerances to properly arrange the lengths of SMA wire. WO-2007/113478 and also WO 2008/099156 do disclose an arrangement having just two lengths of SMA wire so that complete balancing of the actuation force is not achieved. In this case there remains a net force which tilts the camera lens element. Although the tilt is resisted by the flexures of the suspension system, the requirement to provide such resistance puts a design constraint on the lateral stiffness of the flexures and the resultant tilt affects the optical performance of the camera lens element.

SUMMARY

According to a first aspect of the present invention, there is provided a shape memory alloy actuation apparatus comprising:

a support structure;

a movable element;

a suspension system comprising a plurality of flexures coupled between the support structure and the movable element to support the movable element on the support structure and to guide movement of the movable element along a movement axis by deflection of the flexures, the flexures including at least one first flexure and at least one second flexure arranged at different positions along the movement axis;

at least one shape memory alloy wire connected between the support structure and the movable element at an acute angle to the movement axis, the shape memory alloy wire on contraction applying a force to the movable element having a component in a first direction along the movement axis and a component perpendicular to the movement axis, a biasing element connected between the support structure and the movable element and arranged to apply a biasing force to the movable element in a second direction along the movement axis opposite to said first direction, wherein the shape memory alloy actuation apparatus is arranged such that said component of force applied perpendicular to the movement axis compresses the flexures with a compressive force sufficiently high that, across at least part of the range of movement of the movable element along the movement axis, the flexures apply a force to the movable element having a component along the movement axis that is in the same direction as said component of force applied by the shape memory alloy wire along the movement axis.

Thus, the SMA wire applies a component of force perpendicular the movement axis that compresses the flexures. This contrasts with the symmetrical arrangement of flexures around the movement axis disclosed in WO-2007/113478 and WO-2008/099156, that results in rotation of the movable element or else in some flexures being extended. It has been appreciated that arranging for compression of the flexures has benefits of providing a relatively high minimum stress within the SMA wire that is advantageous in allowing operation at high temperatures, whilst reducing the maximum stress within the SMA wire that is advantageous in staying below the SMA material limits at which fatigue occurs and conversely increasing the range of movement achievable without reaching those material limits. These benefits are achieved because the compression of the flexures reduces the force applied by the flexures along the movement axis, correspondingly decreasing the stress generated in the SMA wire by the flexures. Thus the stress generated in the SMA wire is made more dependent on the biasing force generated by the biasing element, allowing the SMA wire to be operated with a relatively high minimum stress with a maximum stress that is reduced as compared to the case that the flexures are not in compression.

Furthermore it has been appreciated that advantages in minimising tilt can be achieved by arranging the flexures to experience a compressive force that is sufficiently high that, across at least part of the range of movement of the movable element along the movement axis, the flexures apply a force to the movable element having a component along the movement axis that is in the same direction as said component of force applied by the shape memory alloy wire along the movement axis. In the absence of compression, the flexures of course apply a force to the movable element having a component along the movement axis that is in the opposite direction as said component of force applied by the shape memory alloy wire along the movement axis, that is because the flexures are deflected and in the absence of compression tend to resiliently resist the applied force. However, with a sufficiently high compressive force the flexures may apply a force in the same direction as the SMA wire, that is the flexures may tend to buckle.

As a result, when the flexures apply a force along the movement axis in the same direction as the SMA wire, the force applied by the biasing element becomes greater than the component of force applied along the movement axis by the SMA wire. This in turn results in the net moment arising from the biasing element and the SMA wire being in an opposite sense to the moment generated by the flexures as a result of component of force applied by flexures perpendicular to the movement axis. The moment arising from the flexures can be understood by noting that the flexures at different positions along the movement axis react with different forces perpendicular to the movement axis due to the displacement of the movable element and hence the displacement of the line of action of the SMA wire. Thus the two moments tend resist each other tending to reduce the tilt of the movable element.

The second aspect of the present invention is concerned with minimising tilt of a movable element supported for movement on a support structure by a suspension system comprising a plurality of flexures, and driven by an SMA wire connected between the support structure and the movable element at an acute angle to the movement axis, the shape memory alloy wire on contraction applying a force to the movable element having a component in a first direction along the movement axis and a component perpendicular to the movement axis.

The problem applies to any type of movable element where tilt is an issue. One situation where the problem is important is where the movable element is a camera lens element in which case tilt can degrade the optical performance of the camera element. For example in the case of a miniature camera, tilt is desirably kept below a limit which may be less than 0.1. Furthermore in the case of a camera lens element, the requirement that the optics are not obstructed tends to mean that the actuation arrangement is arranged to apply an actuation force at a position displaced considerably from the optical axis such that a relatively large moment is generated around the centre of mass.

According to the second aspect of the present invention, there is provided a shape memory alloy actuation apparatus comprising:
  a support structure;
  a movable element;
  a suspension system comprising a plurality of flexures coupled between the support structure and the movable element to support the movable element on the support structure and to guide movement of the movable element along a movement axis by deflection of the flexures, the flexures providing a centre of stiffness at which a force applied to the movable element would not tend to rotate the movable element;
  at least one shape memory alloy wire connected between the support structure and the movable element at an acute angle to the movement axis, the shape memory alloy wire on contraction applying a force to the movable element having a component in a first direction along the movement axis and a component perpendicular to the movement axis;
  an end-stop arranged to limit the movement of the movable element in a second direction along the movement axis opposite to said first direction,
  wherein the shape memory alloy actuation apparatus is arranged such that the moment applied by the end-stop to the movable element about the centre of stiffness when the shape memory alloy wire is not contracted is equal to the moment applied by the shape memory alloy wire to the movable element about the centre of stiffness at the point when the movable element loses contact with the end-stop on contraction of the shape memory alloy wire.

It has been appreciated that in the presence of an end-stop, a specific source of tilt is the tilt occurring as the movable element lifts of the end-stop, referred to herein as lift-off tilt. However, in accordance with this aspect of the invention, such lift off-tilt is removed by means of arranging for (1) the moment applied by the end-stop to the movable element about the centre of stiffness when the shape memory alloy wire is not contracted to equal to (2) the moment applied by the shape memory alloy wire to the movable element about the centre of stiffness at the point when the movable element loses contact with the end-stop on contraction of the shape memory alloy wire. In this regard the centre of stiffness is defined as the point at which a force applied to the movable element would not tend to rotate the movable element, and so would only tend to generate a translation of the movable element.

By arranging the apparatus to meet this condition, lift-off tilt is avoided. This is because the act of the movable element lifting off the end-stop causes the source of the force acting on the movable element to transfer from the end-stop to the SMA wire. Based on appreciation that lift-off tilt results from a change in the moment these forces generate round the centre of stiffness, lift-off tilt is avoided by arranging for these moments to be equal.

Advantageously, in the case that the flexures include at least one first flexure and at least one second flexure arranged at different positions along the movement axis, the shape memory alloy wire is connected to the movable element to apply the component of force perpendicular to the movement axis along a line of action that is in the central 50% of the range between the positions of the at least one first flexure and the at least one second flexure.

This feature is advantageous in arranging to meet the condition on the moments, as follows. In particular it has been appreciated that it is advantageous to arrange the end-stop and to connect the SMA wire to the movable element close to one another, particularly where there is a constraint that they are arranged outside the periphery of the movable element as viewed along the movement axis, for example where the movable element is a camera lens element. In this case, the component of force applied by the SMA wire along the movement axis at the point of lift-off and the force applied by the end-stop without contraction of the SMA wire are applied along close lines of action and are of course equal. This means that there is inherently only a small change in the moment resulting from the component of force applied by the SMA wire along the movement axis and the force applied by the end-stop. Consequently, to meet the condition on the moments set out above, it is desirable that the component of force perpendicular to the movement axis produces a small moment about the centre of stiffness, which is achieved by this component of force acting along a line of action near to the centre of the range between the positions of the at least one first flexure and the at least one second flexure, preferably in the central 50% of this range.

All the aspects of the present invention may be applied to a movable element which is a camera lens element, the movement axis being the optical axis of the camera lens element. Particular advantage is achieved when applied to a miniature camera lens element comprising one or more lenses having a diameter of at most 10 mm.

The various aspects of the invention and the features thereof may be used together in any combination.

BRIEF DESCRIPTION OF THE DRAWINGS

To allow better understanding, an embodiment of the present invention will now be described by way of non-limitative example with reference to the accompanying drawings, in which.

DETAILED DESCRIPTION

There will first be described the structure of a camera 1 incorporating an SMA actuation apparatus. The camera 1 is to be incorporated in a portable electronic device such as a mobile telephone, media player or portable digital assistant.

Figure 1:
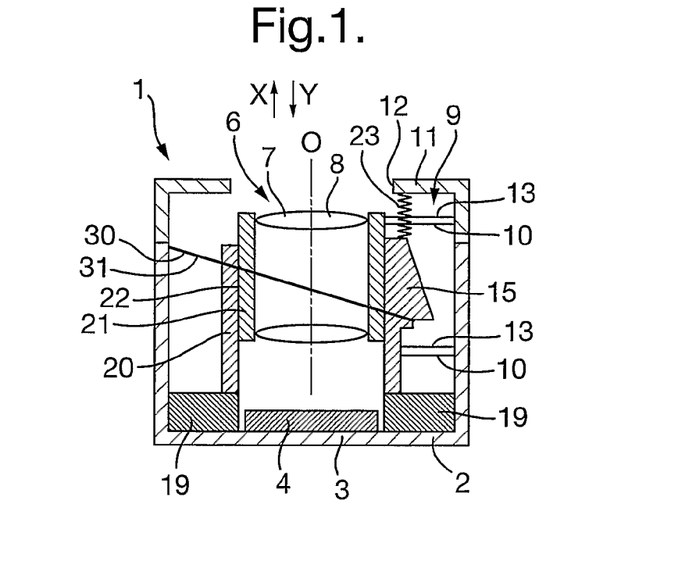
FIG. 1 is a schematic sectional view of a camera.

The camera 1 is shown schematically in FIG. 1 which is a schematic side view of the various functional components of the SMA actuation apparatus of the camera 1. The camera 1 comprises a support structure 2 which may be made of plastic. The support structure has a base portion 3 on which there is mounted an image sensor 4 having an array of light sensitive pixels. The image sensor 4 is typically packaged into a substrate, optionally with a protective cover glass or infrared (IR) filter. The image sensor may be a CCD (charge-coupled device) or a CMOS (complimentary metal-oxide-semiconductor) device. As viewed along the optical axis O, the base portion 3 is generally square and all the components of the camera 1 are within the footprint thereof.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The camera 1 is a miniature camera with the lenses 8 of the lens system 7 typically having a diameter of at most 10 mm.

The lens element 6 is arranged with the optical axis O of the lens system 7 perpendicular to the image sensor 4. In this manner, the lens system 7 focuses light onto the image sensor 4. The basic principle of operation is that lens element 6 is moved along the optical axis O to change the position of the object focal plane focussed on the image sensor 4, the total range of movement achieved determining the range of focus available. The camera 1 is designed to minimise the tilt of the lens optical axis O over that range of movement.

The lens element 6 has a two-part construction comprising a lens carrier 20 and a lens holder 21 mounted inside the lens carrier 20 on an internal screw thread 22 formed inside the lens carrier 20. A typical diameter of the lens holder 21 is 6.5 mm. The lens carrier 20 is connected to the suspension system 9 to suspend the lens element 6. The lens holder 21 mounts the one or more lenses 8 of the lens system 7. Both the lens carrier 20 and the lens holder 21 may be made from moulded plastic.

The lens element 6 is suspended on the support structure 2 by a suspension system 9 consisting of two suspension elements 10. As described further below, each suspension element 10 comprises four resilient flexures 13 coupled between the support structure 2 and the lens element 6, thereby supporting the lens element 6 on the support structure 2. The resilient flexures 13 deflect to guide movement of the lens element 6 along the optical axis O whilst resisting movement of the lens element 6 perpendicular to the optical axis O. An advantage of the use of resilient flexures 13 is that they provide relatively low friction resisting movement.

The camera 1 further comprises an SMA actuator 30 which comprises a piece of SMA wire 31 mechanically coupled to the support structure 2 and to the lens carrier 20 of the lens element 6, as described in more detail below. The SMA wire 31 is held in tension. On heating of the SMA wire 31, the SMA wire 31 contracts, driving movement of the lens element 6 in a first direction X along the optical axis O away from the image sensor 4. The lens element 6 is shown in FIG. 1 in its rest state in which the SMA actuator 30 is not active and not contracted. In this state, the lens element 6 is in its closest position to the image sensor 4 within its range of movement, this position corresponds to far-field or hyperfocal focus, which is the most common setting for the camera 1, particularly if an auto-focus function is provided. In particular, this position is defined by the support structure 2 having an end-stop 19 formed integrally therewith which engages the lens element 6 to limit the movement of the lens element in a second direction Y along the optical axis O (opposite to the first direction X) towards the image sensor 4.

The camera 1 further comprises a biasing element 23 coupled between the support structure 2 and the lens element 6. The biasing element 23 comprises a resilient spring arranged in compression to provide a biasing force to the lens element 6 in the second direction Y along the optical axis O, thereby acting as a biasing means against the force applied by the SMA actuator 30. When the SMA wire 31 is not contracted, in its unheated state, the biasing element 23 holds the lens element 6 in contact with the end-stop 19. This creates a pre-stress which must be overcome by the SMA actuator 30 to generate movement of the lens element 6.

On heating of the SMA actuator 30 the stress therein increases until it overcomes the biasing element 23. At this point, the SMA wire 31 contracts, moving the lens element 6 out of contact with the end-stop 19 and away from the image sensor 4. The lens element 6 moves over a range of movement as the temperature of the SMA wire 31 increases over the range of temperature in which the transition of the material of the SMA wire from the Martensite phase to the Austenite phase. Conversely, on cooling of the SMA wire 31 so that the stress therein decreases, the biasing provided by the biasing element 23 causes the SMA wire 31 to expand moving the lens element 6 towards the image sensor 4.

In FIG. 1, the suspension system 9 is shown schematically on one side of the camera 1 to assist understanding of its function, but in fact the flexures 13 extend around the lens element 6.

The support structure 2 has a cover 11 which attaches to the base 3 of the support structure 2 to protect the other components and has an aperture 12 aligned with the optical axis O through which incident light enters. The biasing element 23 engages the underside of the cover 11.

The construction of the camera 1 will now be described in detail, with reference to FIGS. 2 to 13. A key desire for the camera 1 is to minimise size, and it is designed to be packaged within a given space which is square as viewed along the optical axis O. Within this constraint, the camera 1 is designed to provide the largest possible range of movement of the lens element 6 and the largest possible diameter of the lens system 7. At the same time, the camera 1 is designed to keep the tilt of the lens element 6 over its range of movement within a desired limit appropriate to the optical parameters of the lens system 7. Parasitic movements perpendicular to the optical axis O are undesirable, but less critical if relatively small in magnitude.

Figure 2:
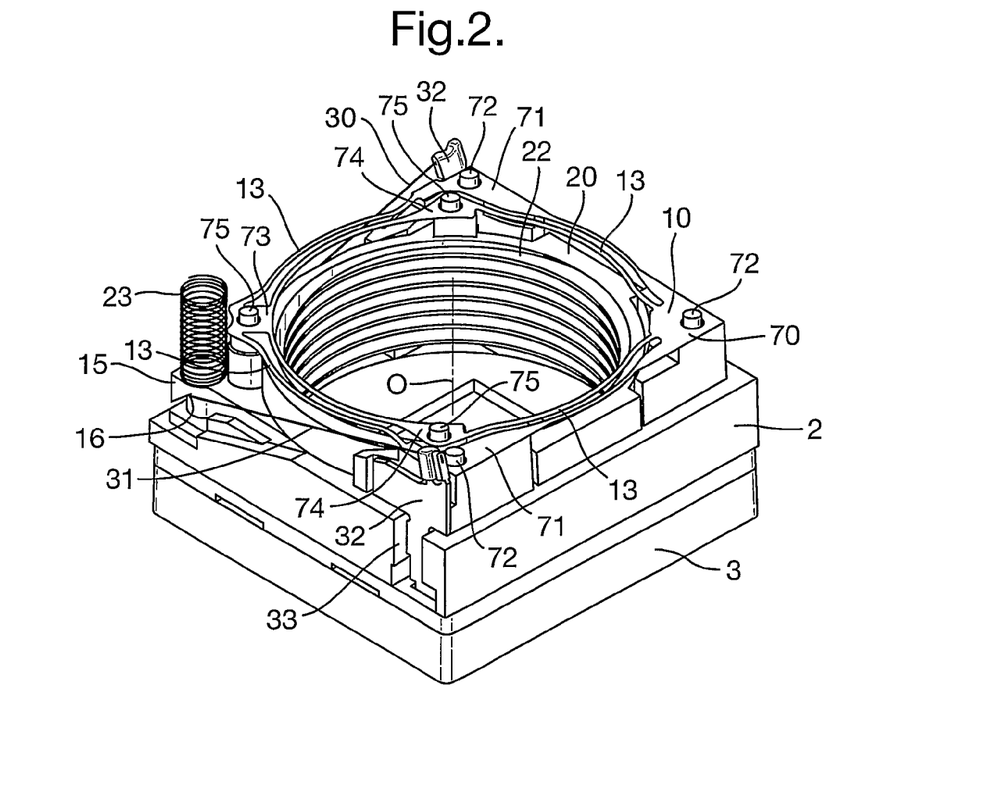
FIG. 2 is a perspective view of the camera with a cover removed.

FIG. 2 is a perspective view of the camera 1 with the cover 11 omitted to show the overall arrangement of one of the suspension elements 10, the SMA actuator 30 and the biasing element 23. In FIG. 2 (and subsequent drawings), the lens holder 21 and lens system 7 are omitted to avoid obscuring other components, but the lens carrier 20 and internal screw thread 22 are visible.

FIG. 2 illustrates the form of one of the suspension elements 10 of the suspension system 9 located on the upper end of the lens element 6, the other suspension element having an identical construction but arranged on the lower end of the lens element 6. The suspension system 9 has the primary purpose of supporting the lens holder 20 and hence the lens element 6 as a whole on the support 2 and guiding movement thereof along the optical axis O whilst limiting tilt thereof. Each suspension element 10 is formed from a single sheet of material such as steel or beryllium copper cut into shape. One possibility is hard rolled grade 302 austenitic steel which has the advantage of providing a high yield stress. Each suspension element 10 has the following construction.

Each suspension element 10 comprises a central support portion 70 fixed to the support structure 2 in one corner of the camera 1 and two outer support portions 71 fixed to the support structure 2 in adjacent corners of the camera 1. The support portions 70 and 71 are fixed in position by being mounted on studs 72 formed protruding from the support structure 2. Each suspension element also comprises a central lens portion 73 fixed to the lens element 6 in a corner of the camera 1 opposite to the central support portion 70 and two outer lens portions 74 fixed to the lens element 6 in adjacent corners of the camera 1 alongside the outer support portions 71. The lens portions 73 and 74 are fixed in position by being mounted on studs 75 formed protruding from lens element 6.

Each suspension element 10 further comprises four flexures 13, a first pair of the flexures 13 extending between the central support portion 70 and the outer lens portions 74 and a second pair of the flexures 13 extending between the outer support portions 71 and the central lens portion 73. Each flexure 13 extends around the optical axis O, the flexures 13 being arranged with mirror symmetry about a notional plane disposed between the flexures 13 and containing the optical axis O. The individual flexures 13 each have three arcuate regions as viewed along the optical axis. This is the same structure, and used for the same reasons, as the corresponding flexures of the camera disclosed in WO 2007/113478, to which reference is made and which is incorporated herein by reference.

As an alternative to the suspension elements 10 having an identical construction, the suspension elements 10 may have a similar overall configuration, but non-uniformly configured to provide differing torques to the lens element 6.

Due to this configuration of the suspension elements 10, the flexures 13 accommodate movement of the lens element 6 relative to the support structure 2 along the optical axis O by resilient flexing or bending. The flexures 13 have a thickness parallel to the optical axis O which is smaller than their width. For example, the flexures might have a width of 130 µm and a thickness of 40 µm when the camera 1 is a miniature camera. As a result, the flexures 13 are more compliant to bending in their thickness direction than to bending in their width direction, thereby providing the suspension system 9 with a lower degree of stiffness against movement of the lens element 6 along the optical axis O, than perpendicular to the optical axis O. Furthermore, as the two suspension elements 10 are spaced apart along the optical axis O, the resistance to movement of the lens element 6 perpendicular to the optical axis O also provides resistance to tilting of the lens element 6.

Now, the SMA actuator 30 and the biasing element 23 will be described.

The primary purpose of the SMA actuator 30 is to apply an actuation force in the first direction X along the optical axis O for driving movement of the lens element 6. The primary purpose of the biasing element 23 is to provide a biasing force in the second, opposite direction Y along the optical axis O. The biasing element 23 accounts for the majority of the load applied to the SMA actuator 30 in the direction of the desired movement along the optical axis. The biasing element 23 is thus designed to ensure the SMA actuator 30 is operating in the appropriate mechanical stress and strain regions.

The biasing element 23 and SMA actuator 30 both engage a mount 15 formed integrally with the lens holder 20 and protruding outwardly from the optical axis O in the same corner of the camera 1 as the central lens portion 73, that is in the opposite corner from the central support portion 70.

The biasing element 23 engages the upper surface of the mount 15, held in compression between the mount 15 and the cover 11.

The SMA actuator engages the mount 15 by means of the SMA wire 31 being hooked over the mount 15, in particular sitting in a notch 16 formed in the outer surface of the mount 15. The notch 16 is curved to reduce the maximum curvature of the SMA wire 31. In this manner, the SMA wire 31 is connected to the lens element 6.

Making connections to the SMA wire 31, both mechanically and electrically is difficult. This is largely due to the hard oxide coating on the wire, but also due to the need to ensure the SMA wire 31 is not damaged during the joining process. Any micro cracks will lead to premature failure of the SMA wire 31. On this basis the manufacturing method of choice is for the piece of SMA wire 31 to be mechanically and electrically connected at each end to a respective crimping member 32, each formed as an elongate piece of metal for example brass. Each crimping member 32 is received in and fixed to a socket portion 33 formed as an integral part of the support structure 2. In this manner, the SMA wire 31 is connected to the support structure 2.

The joining process of choice is to crimp the crimping members 32 over the piece of SMA wire 31. In this way the crimping process breaks through the oxide coating which forms naturally over the SMA wire 31 to form good electrical contact, and an airtight seal around the joint. Care must be taken with the crimping process to avoid wire damage. During manufacture of the SMA actuator 30 the oxide coating may be removed before crimping.

Less preferred but permissible joining methods include welding and soldering. However, both have substantial process development problems. Soldering requires very aggressive fluxes to remove the oxide coating, and welding, requires material matching, and the avoidance of a heat affected zone, which alters the microstructure of the SMA wire. In the future, the welding process in particular may offer manufacturing cost advantages.

Furthermore, the SMA wire 31 is configured with each portion thereof on either side of the mount 15 extending at an angle to the optical axis O. Thus, on contraction of the SMA wire 31 on heating, the SMA wire applies a component of force in the first direction X along the optical axis O away from the image sensor 4 as an actuation force.

The degree of displacement of the lens element 6 relative to the support structure 2 along the optical axis O is dependent on the stress developed within the SMA wire 31 and also on the acute angle of the SMA wire 31 with respect to the optical axis O. The strain which may be developed in an SMA wire is limited by the physical phenomenon of the phase change. Due to the acute angles of the SMA wire 31 with respect to the optical axis O, the SMA wire 31 changes in orientation when it changes in length. This effectively gears the movement so that the degree of displacement of the lens element 6 along the optical axis O is higher than the change in length of the lengths 35 of SMA resolved along the optical axis O. In general the acute angle may take any value but is approximately 70° in this example.

The biasing element 23 is important to the successful use of the SMA wire 31, and to the delivery of the correct displacements and loads to the lens element 6. In order for the camera to be fully functional up to 70° C., the phase transition temperatures of the material of the SMA wire 31 must be above 70° C. In order to achieve this, the mechanical stresses in the SMA wire 31 must be relatively high, as the mechanical stresses affect and control the transition temperatures. In contrast, if the stress in the SMA wire 31 is too high this causes progressive plasticity and fatigue of the wire during use. Therefore the ideal is to operate the SMA wire 31 at a high stress, which is as close to constant as possible over the displacement range to avoid over stressing of the SMA wire 31. This means that there is a relatively narrow region of successful operation to achieve both the requirements for operating at high temperature and for a given lifetime. Likewise the operating strain range needs to be tightly controlled and minimised as this also affects the lifetime of the SMA wire 31. The biasing element 23 is instrumental in setting up the appropriate stress and strain cycles of the SMA wire 31 being formed so that throughout the range of travel there is significant and appropriate pre-load of the SMA wire 31 to generate appropriately high stresses, whilst minimising the variation in stress across the range of travel.

Furthermore, the SMA wire 31 is configured with mirror symmetry about the notional plane extending parallel to the optical axis O between the portions of the SMA wire 31 on each side of the mount 15. Thus, forces perpendicular to that notional plane are balanced. However, the SMA wire 31, on contraction, does apply a component of force perpendicular to the optical axis O, that is along the notional plane. Due the arrangement of the flexures 13, that have mirror symmetry about the same notional plane, this component of force perpendicular to the optical axis O compresses the flexures 13. Thus the flexures 13 may be thought of as having a tendency to buckle, although of course not to the point of failure.

This contrasts with the situation in some prior art documents, such as WO-2007/113478 and WO-2008/099156, where flexures are arranged with a rotationally symmetrical arrangement around the optical axis O, in which case some flexures are held in compression and some in tension.

It has been appreciated that such compression of the flexures 13 provides for a relatively high minimum stress within the SMA wire 31 that allows operation at high temperatures, whilst reducing the maximum stress within the SMA wire 31 allowing the SMA wire 31 to be designed to operate below the SMA material limits at which fatigue occurs, conversely increasing the range of movement achievable without reaching those material limits. This is because the compression of the flexures 13 reduces the force applied by the flexures 13 along the movement axis, correspondingly decreasing the stress generated in the SMA wire 31 by the flexures 13. Thus the stress generated in the SMA wire 31 is made more dependent on the biasing force generated by the biasing element 23, allowing the SMA wire 31 to be operated with a relatively high minimum stress but with a maximum stress that is reduced as compared to the case that the flexures 13 are not in compression.

To put this another way, the angled SMA wire 31 applies both vertical and horizontal forces to the lens element 6. The fraction of the work done on the flexures 13 by the vertical and horizontal components of the tension in the SMA wire 31 will depend on the angle of inclination of the SMA wire 31 and the other forces in the system. It is desirable that much of the work done on the flexures 13 is done by the horizontal force, as this force reduces with stroke, thereby reducing the tension in the SMA wire 31 when hot, while allowing a high tension to be maintained in the SMA wire 31 when cold. Advantageously, the stress in the SMA wire 31 when the energy put into the flexures 31 by the motion of the end of the flexure 13 perpendicular to the optical axis O is comparable to the energy put into the flexures 13 by the force along the optical axis. Preferably the ratio of the energy put into the flexures 13 by the force along the optical axis O to the energy put into the flexures by the lateral motion of the end of the flexures 13 is less than 1 at the maximum deflection of the flexures 13, most preferably being less than 0 (i.e. energy is absorbed by the vertical force). The ratio can be reduced by reducing the angle between the resultant force applied by the wire and the plane of the undeflected flexures and/or by increasing the amount of motion perpendicular to the optical axis O relative to the motion along the optical axis O.

By way of example one can consider a system with a shift perpendicular to the optical axis O of L for a motion along the optical axis O of N, an angle of inclination A of the SMA wire 31, a wire tension T and a bias spring force B. In this system the ratio mentioned above is given by the formula (TN sin (A)−BN)/TL cos(A).

In addition, tilt can be minimised by control of the compressive force with which the flexures 13 are compressed. In particular, the compressive force is sufficiently high that the flexures 13 apply a force to the lens element 6 having a component along the optical axis O that is in the same direction as said component of force applied by the SMA 31 wire, that is in the first direction X. This condition is designed to be met across at least part of the range of movement of the movable element along the optical axis. The action of the force from the flexures 13 in this direction is counter-intuitive as flexures normally provide a reactive force in an opposite direction to that in which they are deflected, that is in the second direction Y towards the image sensor 4, when deflected in the first direction X away from the image sensor 4. However, under a sufficient degree of compression, the flexures 13 apply a force in the opposite direction, as they tend to buckle. This may be thought of as the compression causing the flexures 13 to have a lower energy state on further deflection. The result is that the flexures 13 may be considered to act as a spring with a negative spring constant.

It will now be described how this minimises tilt with reference to FIGS. 3 and 4 which are schematic views of the lens element 6 supported on the support structure 2 by the flexures 13 which are deflected (the degree of deflection being exaggerated in FIGS. 3 and 4). The forces acting on the lens element 6 are as follows. The SMA wire 31 applies a force that has a component $F_O$ along the optical axis O in direction X and a component $F_H$ perpendicular to the optical axis O. The biasing element 23 applies a biasing force $F_B$ along the optical axis O in direction Y.

The flexures 13 together provide a reactive force $F_R$ in reaction to the to the component $F_H$ perpendicular to the optical axis O. Due to the deflection of the lens element 6, these forces perpendicular to the optical axis O tend to rotate the lens element 6, for example anticlockwise in FIGS. 3 and 4. This may be understood from the movement of the lens element 6 (exaggerated in FIGS. 3 and 4) causing the line of action of the component $F_H$ of force from the SMA wire 31 perpendicular to the optical axis O moving away from the line of action of the reactive force $F_R$.

Figure 3:
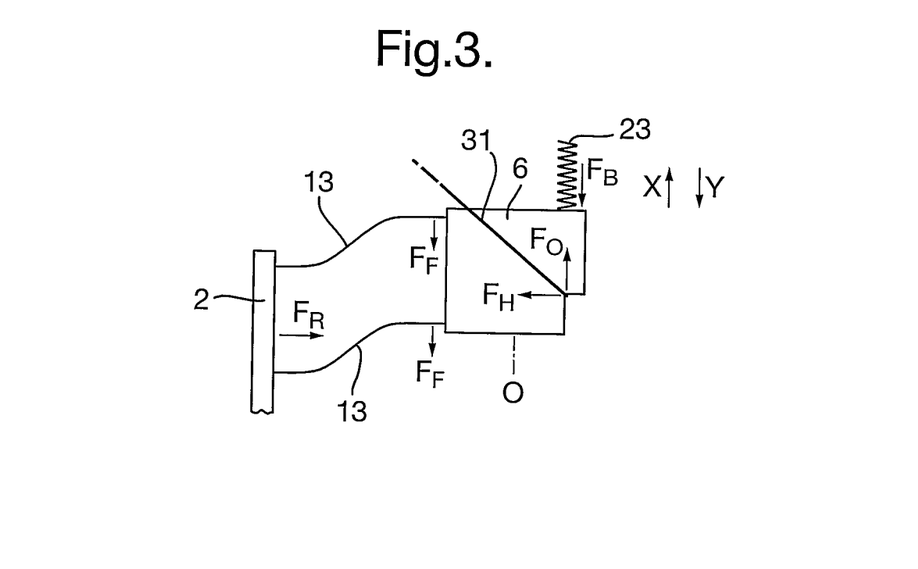
FIGS. 3 and 4 are schematic views of the lens element supported on the support structure.

FIG. 3 shows the case that the flexures 13 are not in compression. In this case, the component $F_F$ of force applied by the flexures 13 along the optical axis O is in the second direction Y, meaning that the component $F_O$ of force applied by the SMA wire 31 along the optical axis O is less than the biasing force $F_B$, as $F_O=F_B+F_F$. This means that the component $F_O$ of force applied by the SMA wire 31 along the optical axis O and the biasing force $F_B$ together tend to rotate the lens element 6 in the same direction as the horizontal forces, for example anticlockwise in FIG. 3. Thus, both horizontal and vertical forces tend to tilt the lens element 6.

Figure 4:
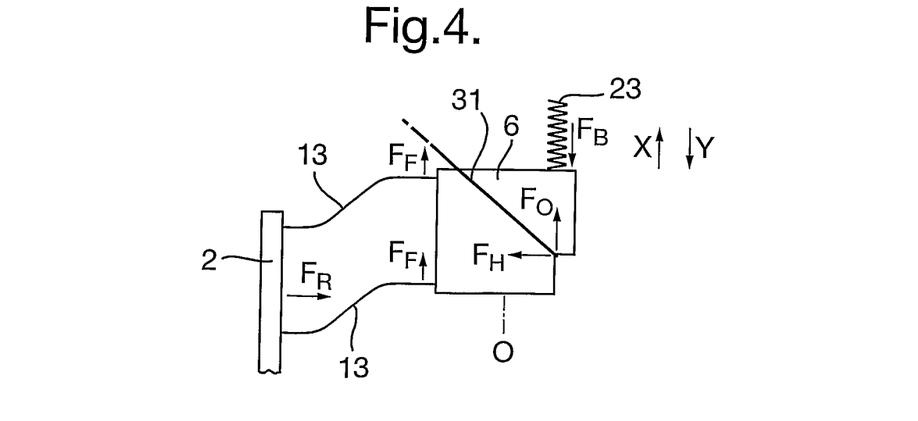

FIG. 4 shows the case that the flexures 13 are in compression. In this case, the component $F_F$ of force applied by the flexures 13 along the optical axis O is in the first direction X, meaning that the component $F_O$ of force applied by the SMA wire 31 along the optical axis O is greater than the biasing force $F_B$, as $F_O=F_B-F_F$. This means that the component $F_O$ of force applied by the SMA wire 31 along the optical axis O and the biasing force $F_B$ together tend to rotate the lens element 6 in the opposite direction as the horizontal forces, for example clockwise in FIG. 4. Thus, the horizontal and vertical forces tend to compensate each other in terms of the tilt of the lens element 6. Thus the tilt is reduced.

As the tilting caused by the horizontal forces is greatest at the greatest deflection of the flexures 13, desirably the flexures 13 experience the high compressive force at least across this part of the range of movement of the lens element 6.

There will now be described how lift-off tilt is reduced by the design of the mount 15, which is illustrated in detail in FIG. 5. Lift-off tilt is the tilt of the lens element 6 that occurs as the lens element 6 comes out of contact with the end-stop 19. Lift-off tilt is reduced by designing the mount 15 taking into account the changes in forces applied to the lens element 6 as it comes out of contact with the end-stop 19, as follows.

As already described, the biasing element 23 engages the upper surface of the mount 15 and the SMA wire 31 is hooked in a notch 16 in the mount 15. In addition, the mount 15 has a protrusion 17 that engages the end-stop 19 when the SMA wire 31 is not contracted. The protrusion 17 has an arcuate outer surface that engages a flat surface of the end-stop 19 to provide a point contact at a point 18. The static tilt of the lens element 6 is minimised by positioning the point 18 and the biasing element 23 such that the tilt induced by the biasing element 23 is counteracted by the tilt induced by the end-stop 19. In the camera 1, the protrusion 17 is arranged to position the point 18 within 200 μm of the line of action of the bias force $F_B$.

On lift-off there is a transfer between the following two forces acting on the lens element 6. When the SMA wire 31 is not contracted, the end-stop applies a force $F_E$ to the lens element 6, acting through the point 18, as shown in FIG. 5. When the SMA wire 31 contracts it applies a force that has a component $F_O$ along the optical axis O and a component $F_H$ perpendicular to the optical axis O, this force lifting the lens element 6 out of contact with the end-stop 19 so that the force $F_E$ is no longer applied. To avoid lift-off tilt, this transfer of force must not tilt the lens element 6. To achieve this, the force $F_E$ applied by the end-stop 19 before contraction of the SMA wire 31 and the force applied by the SMA wire 31 at the point when the lens element 6 loses contact with the end-stop 19 on contraction of the SMA wire 31 apply the same moment about a centre of stiffness is defined as the point at which a force applied to the lens element 6 would not tend to rotate the lens element 6, and so would only tend to generate a translation of the lens element 6, and is defined when the lens element 6 has just lifted off the end-stop 19. Thus if the changing forces apply the same moment around the centre of stiffness, there is no change in the moment, and hence no tilt, on lift-off.

The centre of stiffness is dependent on the stiffnesses of the suspension system 9 and may be derived for a given camera 1 by finite element analysis, for example. If the suspension system 9 comprises two suspension elements 10 that are identical, the centre of stiffness lies in a plane mid-way between the positions of the two suspension elements 10 along the optical axis O.

The condition on the moments applied by the force $F_E$ applied by the end-stop 19 and the force applied by the SMA wire 31 may be met by selection of the location of the notch 16 and the location of the point 18 on the protrusion 17, having regard to the location of the centre of stiffness. Meeting this condition is simplified by the fact that the magnitude of the force $F_E$ applied by the end-stop 19 is equal to the component $F_O$ along the optical axis O of the force applied by the SMA wire 31, being both equal to the biasing force $F_B$ applied by the biasing element 23. Thus the magnitude of the component $F_H$ along the optical axis O of the force applied by the SMA wire 31 is dependant on the angle of inclination of the SMA wire 31.

Figure 5:
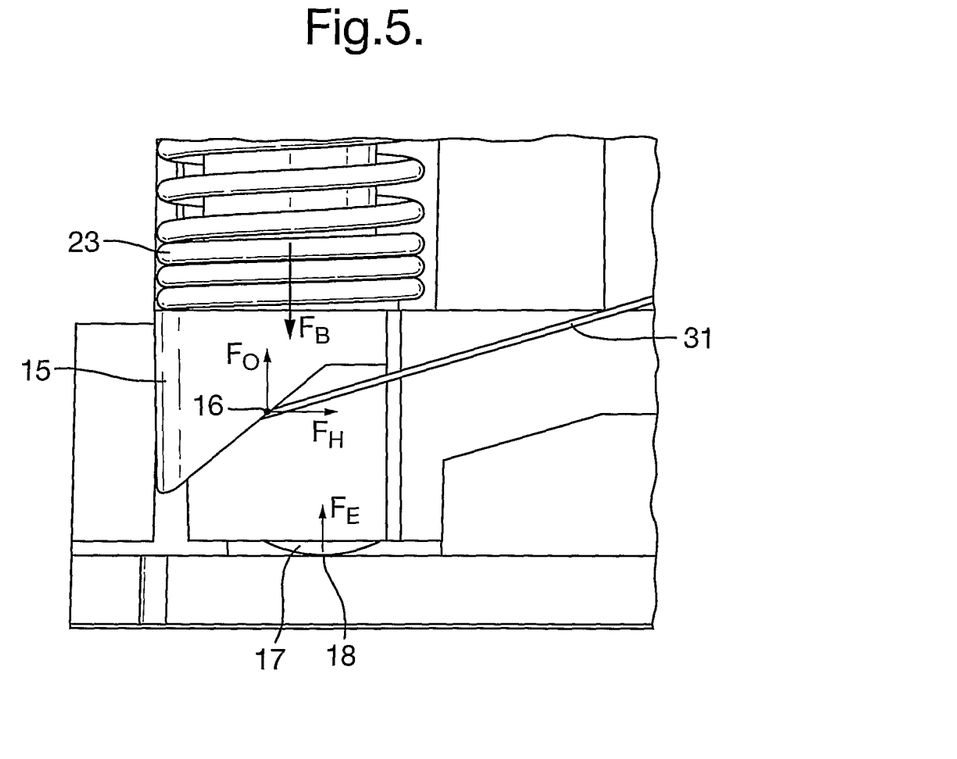
FIG. 5 is an enlarged view of the mount on the camera lens.

Furthermore, it is noted that the force $F_E$ applied by the end-stop 19 and the component $F_O$ along the optical axis O of the force applied by the SMA wire 31 typically act along lines of action that are close together, as shown in FIG. 5, and so apply similar moments. Therefore, to ensure the total moments are the same, typically the component $F_H$ along the optical axis O of the force applied by the SMA wire 31 needs to pass along a line of action close to the centre of stiffness. If the two suspension elements 10 are identical or similar, then this means that the centre of stiffness is at or close to mid-way between the positions of the two suspension elements 10 along the optical axis O, and thus that the component $F_H$ along the optical axis O of the force applied by the SMA wire 31 needs to pass along a line of action at or close to this mid-way position. In typical designs of the camera 1, variations in (a) the two suspension elements 10, and (b) the lines of action of the forces $F_E$ and $F_O$ result in the component $F_H$ along the optical axis O of the force applied by the SMA wire 31 acts along a line of action in the central 50% of the range between the positions of the two suspension elements 10 along the optical axis O.

The operation of the camera 1 to drive movement of the lens element 6 along the optical axis O relative to the support structure 2 will now be described.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA wire 31 causes it to decrease in length. This provides a net tensional force along the optical axis O between the lens element 6 and the support structure 2 in the direction X moving the lens element 6 away from the image sensor 4. This force acts against the biasing force provided by the biasing element 23 and the suspension system 9 in the opposite direction Y along the optical axis O. The biasing element 23 and the flexures 13 deflect depending on the tensional force from the lengths 35 of SMA wire 31. On flexing the biasing element 23 and the flexures 13 remain generally straight although some slight curvature may be generated. Thus the deflection of the biasing element 23 and the flexures 13 provides biasing of the lens element 6 in the direction Y.

The position of the lens element 6 relative to the support structure 2 along the optical axis O may be controlled by control of the temperature of the SMA wire 31. In operation, heating of the SMA wire 31 is provided by passing a current therethrough which provides resistive heating. Cooling is provided by ceasing the current and allowing the SMA wire 31 to cool by conduction to the surroundings. The current is controlled by a control circuit 50 which is described further below.

The SMA wire 31 may be made of any suitable SMA material, for example Nitinol or another Titanium-alloy SMA material. Advantageously, the material composition and pretreatment of the piece of SMA wire 31 is chosen so that the phase change occurs over a range of temperature which is (a) above the expected ambient temperature during normal operation, typically above 70° C. and (b) as wide as possible to maximise the degree of positional control.

High speed actuation of the lens element 6 is desired in many applications, for example if an auto-focus function is provided. The speed of response of the actuation is limited by the cooling of SMA wire 31. The cooling may be speeded up by reducing the thickness of the SMA wire 31. For the size of cameras and wires under consideration, the cooling time changes approximately linearly with wire diameter. For this reason, the thickness of the SMA wire 31 is desirably at most 35 m to provide a response which is acceptable for an auto-focus application of the camera 1.

The nature of the control circuit 50 and the control effected thereby will now be described.

Figure 6:
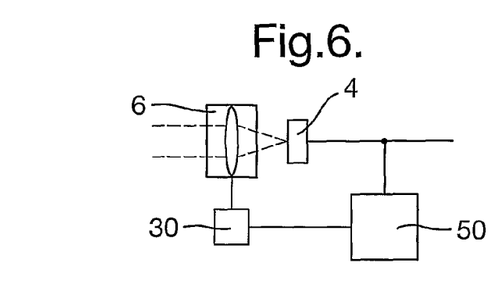
FIG. 6 is a schematic diagram of the overall control arrangement of the camera.

A schematic view of the overall control arrangement is shown in FIG. 6. The control circuit 50 is connected to the SMA actuator 30 and applies a current thereto to control the temperature of the SMA actuator 30 which moves the lens element 6 and changes the focus of the image formed on the image sensor 4. The output of the image sensor 4 is supplied to the control circuit 50 to be processed for determination of a measure of the quality of focus.

Figure 7:
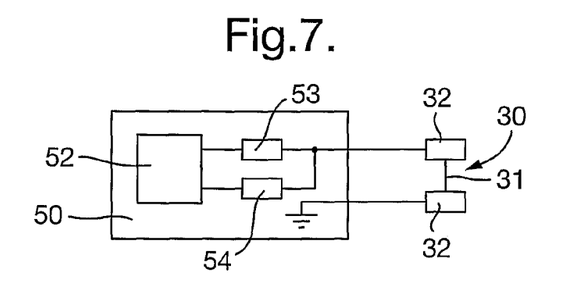
FIG. 7 is a diagram of the control circuit.

The control circuit 50 is shown in FIG. 7. The control circuit 50 is connected to each of the crimping members 32 which provide electrical connection to the piece of SMA wire 31 by means of the crimping thereof. The electrical connections 55 between the control circuit 50 and the crimping members 32 are formed by a conductive adhesive (e.g. silver-filled epoxy). It is undesirable to solder the control circuit 50 to the SMA actuator 30 because of potential damage caused by heating during the soldering process, or because of flux emissions caused by the soldering process.

The control circuit 50 supplies a current between the two crimping members 32. The control circuit 50 controls the degree of heating of the piece of SMA wire 31 by varying the power of the current flowing therethrough. The control circuit 50 varies the power of the current in response to the resistance of the piece of SMA wire 31 which is used as a measure of the position of the lens element 6. Other measures of position such as the temperature measured by a temperature sensor or a direct measure of the position of the lens element 6 output by a position sensor could be used, but a resistance sensor is advantageous because it does not increase the package size of the camera due to being implemented merely by additional components in the control circuit 50.

The physical phenomena behind the use of resistance are as follows.

On heating of the SMA, there is an increase of resistivity with temperature as for most materials. This occurs inside and outside the range of temperature over which the phase-change occurs (the phase transition range) and hence over which the SMA contracts. However inside the phase transition range two further effects occur. Firstly, the Austenite phase has a higher resistivity than the Martensite phase which tends to increase resistance with temperature. However, an opposing effect is that the change of geometry, involving a reduced length and increased cross-sectional area, tends to reduce resistance with temperature. This opposing effect is significantly greater than the other effects. Thus, during heating from low temperature, when the phase transition range is reached and the SMA starts to contract, after an initial rise of resistance the geometrical effect rapidly dominates with the result that during the major part of the contraction the resistance of the SMA actuator decreases. This occurs until the phase change has occurred in nearly all of the SMA so that the degree of contraction falls allowing the resistance to rise.

Figure 8:
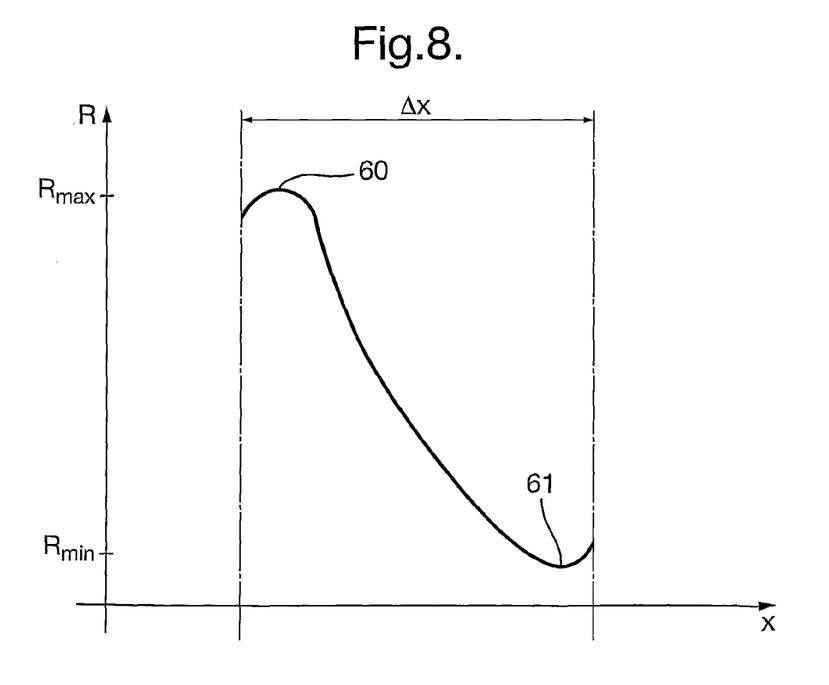
FIG. 8 is a graph of the resistance-length property of SMA during contraction.

Thus, SMA has a property that resistance varies with length during heating and contraction along a curve of the form shown in FIG. 8 which is a graph of resistance of the SMA against length of the SMA, corresponding to the position x of the lens element 6, the length increasing as the SMA contracts corresponding to increasing temperature. Thus across the phase transition range, the lens element 6 moves across a positional range $\Delta x$ due to the contraction of the SMA. The resistance rises across a small initial part of the positional range $\Delta x$ to a local maximum 60 having a resistance value Rmax. The resistance falls across the major part of the positional range $\Delta x$ to a local minimum 61 having a resistance value Rmin, whereafter the resistance rises across a small final part of the positional range $\Delta x$.

Due to this property of SMA material, the control circuit 50 implements control based on the measured resistance as follows. From an unheated state, the control circuit 50 heats the piece of SMA wire 31 until the local maximum resistance value is detected. This is used as an indication that contraction has started to occur. In fact a small amount of contraction has already occurred. However the local resistance maximum 60 can be easily detected, whereas the start of the positional range $\Delta x$ cannot. Accordingly, the local resistance maximum 60 is used and this is so close to the start of the positional range $\Delta x$ that the loss of movement is not significant.

Thereafter the control circuit 50 heats the piece of SMA wire 31 using the measured resistance as a measure of position. The local minimum resistance 61 is used to indicate the end of the positional range $\Delta x$. In fact, a small amount of contraction is still available. However the local minimum resistance 61 can be easily detected, whereas the end of the positional range $\Delta x$ cannot. Accordingly, the local minimum resistance 61 is used. This is so close to the end of the of the positional range $\Delta x$ that the loss of movement is not significant. Furthermore use of the positional range $\Delta x$ above the local minimum resistance 61 can reduce the lifetime of the piece of SMA wire 31 as described further below.

The control circuit 50 uses pulse-width modulation (PWM). In particular, the control circuit 50 applies a pulse-width modulated current pulses (which may be of constant current or constant voltage) and varies the duty cycle in order to vary the power of the current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example with a duty cycle varying in the range from 5% to 95%. When the duty cycle is at a low value within this range, the average power in the piece of SMA wire 31 is low and so the wire cools even though some current is being supplied. Conversely, when the duty cycle is at a high value in the range, the piece of SMA wire 31 heats. The resistance is measured during the current pulse, for example after a short, predetermined delay from the start of the pulse.

During heating of the piece of SMA wire 31 from a cool state below the phase transition range, the resistance varies with position in the manner shown in FIG. 8 in a manner which is consistent from sample to sample and in successive heating cycles. However, during cooling the resistance changes along a curve of similar form but the variation of resistance is less repeatable from sample to sample and there is variable hysteresis as compared to the heating. This does not prevent the use of resistance as a measure of position during cooling altogether, but does reduce the accuracy of the control. This problem is avoided by the control circuit 50 following a predetermined and repeated motion in which positional control is only effected during heating of the sample as described below.

The control circuit 50 includes the following components.

The control circuit 50 includes a drive circuit 53 which is connected to supply current to the piece of SMA wire 31. The drive circuit 53 may be a constant-voltage current source or a constant-current current source. For example, in the latter case the constant current might be of the order of 120 mA.

The control circuit 50 further includes a detection circuit 54 arranged to detect the resistance of the SMA actuator 30.

In the case that the drive circuit 53 is a constant-current current source, the detection circuit 54 may be a voltage detection circuit operable to detect the voltage across the SMA actuator 30 which is a measure of the resistance of the piece of SMA wire 31.

In the case that the drive circuit 53 is a constant-voltage current source, the detection circuit 54 may be a current detection circuit.

For a higher degree of accuracy the detection circuit 54 may comprise a voltage detection circuit and a current detection circuit operable to detect the voltage and current across the SMA actuator and to derive a measure of resistance as the ratio thereof.

A controller 52 implemented by a suitable microprocessor controls the drive circuit 53 to supply a pulse-width modulated current. The controller 52 receives the resistance measured by the detection circuit 54 and performs the PWM control in response thereto.

The control circuit 50 may have a detailed circuit implementations as shown in, and described with reference to, FIGS. 17 and 18 of WO-2008/129290 which is incorporated herein by reference.

The control circuit 50 varies the power of the current using the measured resistance of the SMA actuator as a feedback signal to drive the measured resistance to a target value. In particular, the duty cycle of the pulse-width modulated current is varied. The controller 52 may implement a number of control algorithms to vary the duty cycle. One possibility is proportional control in which the duty cycle is varied by an amount proportional to the difference between the detected resistance and the target resistance. As the piece of SMA wire 31 heats across the active temperature region, the decrease in resistance is sensed and used in a feedback control technique. The stability of the feedback control is maintained by the inherent proportional-integral action of the piece of SMA wire 31 itself during heating. The overall feedback response is dominated by the response of the whole of the heating of the piece of SMA wire 31. Such a proportional control feedback loop provides for accurate control of position.

The piece of SMA wire 31 may have some non-linearities in its response. Such non-linearities may be limited by incorporating precompensation in the control circuit 50. One option is for the precompensation to consist of a gain or offset modifier on the output signal supplied to the drive circuit 53, for example based on the demand and the history of the demand signal. This is most beneficial if insufficient feedback is present to control the piece of SMA wire 31.

The control circuit 50 may implement an autofocus algorithm. In this case, the control may be based on a measure of the focus of the image, for example a modulation transfer function or a spatial frequency response, derived by the controller 52 from the image signal from the image sensor 4. A wide range of suitable measures are known and any such measure may be applied.

In this case, there is a limitation that the derivation of the measure of focus is slow. To combat this, during a scan across many focus positions, at the desired focus position determined from the measure of focus, the control circuit 50 may determine the resistance value. Then at the end of the scan the lens element 6 is driven back to the same position of the basis of that resistance value rather than the focus measure.

In this case, an image signal from the image sensor 4 is used to derive the primary feedback parameter, any drifting in the absolute values of the measure of the position as a secondary parameter over repeated cycles and age is irrelevant, as there is no perceivable change over the course of a single autofocus cycle. In a given camera 1, the resistance might vary from 10Ω at high temperature to 12 at low temperature, and then over the course of several 100 k cycles, this may change to 15Ω at high temperature and 20Ω at low temperature. However, for any given cycle, best focus will correspond to a specific resistance to a sufficient degree of accuracy. Thus it is only necessary to return to this specific resistance, irrespective of its absolute value.

Examples of control algorithms which may be performed by the controller 52 are described in the following applications filed by the same applicant: International Patent Application No. PCT/GB07/001,050 (WO-2007/113478); International Patent Application No. PCT/GB08/000,478 (WO-2008/099156); International Patent Application No. PCT/GB08/001,402 (WO-2008/129291); and International Patent Application No. PCT/GB08/000477 (WO-2008/099155), each of which is incorporated herein by reference.

Whilst the embodiments described above relate to a camera incorporating an SMA actuation arrangement which drives movement of a camera lens element, the SMA actuation arrangements described can equally be adapted to drive movement of an object other than a camera lens element.

The invention claimed is:

1. A shape memory alloy actuation apparatus comprising:
a support structure;
a movable element;

a suspension system comprising a plurality of flexures coupled between the support structure and the movable element to support the movable element on the support structure and to guide movement of the movable element along a movement axis by deflection of the flexures, the flexures including at least one first flexure and at least one second flexure arranged at different positions along the movement axis;

at least one shape memory alloy wire connected between the support structure and the movable element at an acute angle to the movement axis, the shape memory alloy wire on contraction applying a force to the movable element having a component in a first direction along the movement axis and a component perpendicular to the movement axis;

a biasing element connected between the support structure and the movable element and arranged to apply a biasing force to the movable element in a second direction along the movement axis opposite to said first direction, wherein the shape memory alloy actuation apparatus is arranged such that said component of force applied perpendicular to the movement axis compresses the flexures with a compressive force sufficiently high that, across at least part of the range of movement of the movable element along the movement axis, the flexures apply a force to the movable element having a component along the movement axis that is in the same direction as said component of force applied by the shape memory alloy wire along the movement axis.

2. A shape memory alloy actuation apparatus according to claim 1, wherein the shape memory alloy wire comprises two portions arranged with mirror symmetry about a notional plane.

3. A shape memory alloy actuation apparatus according to claim 2, wherein the shape memory alloy wire is a continuous piece hooked over the movable element to form the two portions on either side thereof.

4. A shape memory alloy actuation apparatus according to claim 2, wherein the at least one first flexure comprises at least one pair of flexures arranged with mirror symmetry about said notional plane, and the at least one second flexure also comprises at least one pair of flexures arranged with mirror symmetry about said notional plane.

5. A shape memory alloy actuation apparatus according to claim 4, wherein said flexures extend around the movement axis.

6. A shape memory alloy actuation apparatus according to claim 1, wherein the apparatus further comprises an end-stop arranged to limit the movement of the movable element in the second direction along the movement axis, the apparatus being arranged such that, when the moveable element is held against the end-stop, the force applied by the biasing element in said second direction is greater than the force applied by the flexures of the suspension system.

7. A shape memory alloy actuation apparatus according to claim 1, wherein the flexures are non-uniformly configured.

8. A shape memory alloy actuation apparatus according to claim 7, wherein the at least one first flexure and the at least one second flexure are non-uniformly configured to apply said forces by:
having different lengths; and/or
being deflected, at a given position of the movable element, by different amounts from their respective non-deflective positions.

9. A shape memory alloy actuation apparatus according to claim 1, wherein the movable element is a camera lens element, the movement axis being the optical axis of the camera lens element.

10. A shape memory alloy actuation apparatus according to claim 9, wherein the camera lens element comprises one or more lenses having a diameter of at most 10 mm.

11. A shape memory alloy actuation apparatus comprising:
a support structure;
a movable element;
a suspension system comprising a plurality of flexures coupled between the support structure and the movable element to support the movable element on the support structure and to guide movement of the movable element along a movement axis by deflection of the flexures, the flexures providing a centre of stiffness at which a force applied to the movable element would not tend to rotate the movable element;
at least one shape memory alloy wire connected between the support structure and the movable element at an acute angle to the movement axis, the shape memory alloy wire on contraction applying a force to the movable element having a component in a first direction along the movement axis and a component perpendicular to the movement axis;
an end-stop arranged to limit the movement of the movable element in a second direction along the movement axis opposite to said first direction,
wherein the shape memory alloy actuation apparatus is arranged such that the moment applied by the end-stop to the movable element about the centre of stiffness when the shape memory alloy wire is not contracted is equal to the moment applied by the shape memory alloy wire to the movable element about the centre of stiffness at a point when the movable element loses contact with the end-stop on contraction of the shape memory alloy wire.

12. A shape memory alloy actuation apparatus according to claim 11, wherein the flexures include at least one first flexure and at least one second flexure arranged at different positions along the movement axis, and the shape memory alloy wire is connected to the movable element to apply the component of force perpendicular to the movement axis along a line of action that is in the central 50% of the range between the positions of the at least one first flexure and the at least one second flexure along the movement axis.

13. A shape memory alloy actuation apparatus according to claim 12, wherein the shape memory alloy wire comprises two portions arranged with mirror symmetry about a notional plane.

14. A shape memory alloy actuation apparatus according to claim 13, wherein the shape memory alloy wire is a continuous piece hooked over the movable element to form the two portions on either side thereof.

15. A shape memory alloy actuation apparatus according to claim 13, wherein the at least one first flexure comprises at least one pair of flexures arranged with mirror symmetry about said notional plane, and the at least one second flexure also comprises at least one pair of flexures arranged with mirror symmetry about said notional plane.

16. A shape memory alloy actuation apparatus according to claim 15, wherein said flexures extend around the movement axis.

17. A shape memory alloy actuation apparatus according to claim 11, further comprising a biasing element connected between the support structure and the movable element and arranged to apply a biasing force to the movable element in a second direction along the movement axis opposite to said first direction, wherein the apparatus is arranged such that, when the moveable element is held against the end-stop, the force applied by the biasing element in said second direction is greater than the force applied by the flexures of the suspension system.

18. A shape memory alloy actuation apparatus according to claim 11, wherein the movable element is a camera lens element, the movement axis being the optical axis of the camera lens element.

19. A shape memory alloy actuation apparatus according to claim 18, wherein the camera lens element comprises one or more lenses having a diameter of at most 10 mm.

* * * * *